US007411691B2

(12) United States Patent
Hughes et al.

(10) Patent No.: US 7,411,691 B2
(45) Date of Patent: Aug. 12, 2008

(54) IMAGE-FORMING SYSTEM WITH AUTOMATIC FINISH OUTPUT CHAINING

(75) Inventors: Mark Hughes, Spencerport, NY (US); Frederick E. Altrieth, III, Scottsville, NY (US)

(73) Assignee: Eastman Kodak Company, Rochester, NY (US)

( * ) Notice: Subject to any disclaimer, the term of this patent is extended or adjusted under 35 U.S.C. 154(b) by 928 days.

(21) Appl. No.: 10/235,282

(22) Filed: Sep. 4, 2002

(65) Prior Publication Data

US 2003/0053126 A1 Mar. 20, 2003

Related U.S. Application Data

(60) Provisional application No. 60/317,589, filed on Sep. 5, 2001.

(51) Int. Cl.
*G06K 15/00* (2006.01)
*G03G 15/00* (2006.01)

(52) U.S. Cl. .................................... 358/1.15; 358/1.1

(58) Field of Classification Search ................ 399/381, 399/391, 405, 407, 410, 377; 271/279, 288, 271/290, 298, 300
See application file for complete search history.

(56) References Cited

U.S. PATENT DOCUMENTS

| | | | | |
|---|---|---|---|---|
| 4,329,046 | A * | 5/1982 | Burkett et al. | 355/77 |
| 4,486,014 | A * | 12/1984 | Enoguchi et al. | 271/200 |
| 5,358,238 | A | 10/1994 | Mandel et al. | |
| 5,371,573 | A | 12/1994 | Kagaya et al. | |
| 5,602,973 | A * | 2/1997 | Nishiwaki | 358/1.14 |
| 5,640,232 | A | 6/1997 | Miyake et al. | |
| 5,961,115 | A * | 10/1999 | Blanck et al. | 271/263 |
| 6,393,232 | B1 * | 5/2002 | Osari et al. | 399/82 |
| 6,494,453 | B1 * | 12/2002 | Yamada et al. | 271/288 |
| 6,512,899 | B2 * | 1/2003 | Shimada et al. | 399/82 |
| 6,781,708 | B1 * | 8/2004 | Wada | 358/1.12 |

FOREIGN PATENT DOCUMENTS

| | | |
|---|---|---|
| EP | 1 085 745 A2 | 3/2001 |
| EP | 1 090 866 A1 | 4/2001 |
| JP | 2001 106418 A | 4/2001 |

* cited by examiner

*Primary Examiner*—Gabriel Garcia
(74) *Attorney, Agent, or Firm*—Richard A. Romanchik

(57) ABSTRACT

This invention provides an image-forming system having automatic finish output chaining, where an imaging job can switch to an alternate destination when a default destination is no longer usable.

32 Claims, 4 Drawing Sheets

IMAGE-FORMING SYSTEM WITH AUTOMATIC FINISH OUTPUT CHAINING

CROSS REFERENCE TO RELATED APPLICATIONS

This application is based on Provisional Application Serial No. 60/317,589 entitled "IMAGE-FORMING SYSTEM WITH AUTOMATIC FINISH OUTPUT CHAINING" filed on Sep. 5, 2001. The benefit of the filing date of the Provisional Application is claimed for this application.

FIELD

This invention generally relates to image-forming systems. More particularly, this invention relates to image-forming machines and methods that automatically use another finishing destination when one finishing destination is no longer usable.

BACKGROUND

An image-forming machine transfers images from original documents onto paper or other medium to create a finished product such as a booklet, a folded brochure, or a tabbed notebook. The original documents may be in hard copy (paper or other medium) or in electronic form (floppy disk, compact disc, and the like) or may be transmitted over a network such as the Internet. Many print jobs have a long run length due to many factors such as large numbers of original documents and large numbers of finished product or sets. An image-forming machine usually operates unattended for print jobs with long run lengths. With this type of operation, there can be a loss of productivity and other losses when a finishing destination is no longer usable during the image-forming process. A finishing destination may no longer be usable if the destination becomes full or is unlocked (accessed by a user) during the image-forming process. The image-forming machine usually shuts down when the finishing destination is full or unlocked, thus requiring the operator to restart the image-forming machine after emptying or locking the finishing destination. The time between shutdown and restart of the image-forming machine is considered lost time.

SUMMARY

This invention provides an image-forming system having automatic finish output chaining. The image-forming system can switch an imaging job to an alternate destination when a default destination is no longer usable.

In one aspect, the image-forming machine has a marking engine, a finisher, and at least two finishing destinations. The finisher is disposed to receive at least one sheet from the marking engine. The finishing destinations are disposed to receive the at least one sheet from the finisher. The finisher automatically changes from one finishing destination to another finishing destination when the one finishing destination has an unlock condition or a full condition. The one and the other finishing destinations are different types of finishing destinations In another aspect, the image-forming system comprises a finisher connected to a marking engine. At least one of the marking engine and the finisher has a first finishing destination and a second finishing destination. The first finishing destination receives an imaging job from the marking engine. The imaging job switches from the first finishing destination to the second finishing destination in response to an unlock trigger or a full condition. The first and second finishing destinations are different types of finishing destinations.

In one method for automatic finish output chaining in an image-forming machine, an unlock condition or a full condition is detected in one finishing destination. It is determined whether an imaging job can switch to another finishing destination, where the one and the other finishing destinations are different types of finishing destinations. If an unlock condition exists, it is determined whether stapling is selected. If no stapling selected, it is determined whether there is a paper size conflict. If there is no paper size conflict, the imaging job is switched to another finishing destination.

In another method for automatic finish output chaining in an image-forming machine, an unlock condition or a full condition is detected in one finishing destination. It is determined whether an imaging job can switch to another finishing destination, where the one and the other finishing destinations are different types of finishing destinations. If a full condition exists, it is determined whether a switch can be made at a set boundary, a subset boundary, or a job boundary of an imaging job. If a switch can be made at the set boundary, the subset boundary, or the job boundary of an imaging job, the imaging job is switched to another finishing destination at that boundary. If switch cannot be made at the set boundary, the subset boundary, or the job boundary of an imaging job, the imaging job is switched to a next exit finishing destination.

In a further method for automatic finish output chaining in an image-forming system, the image-forming system has at least two finishing destinations. The image-forming machine detects whether a default finishing destination of an imaging job is no longer usable. The image-forming machine switches the imaging job from the default finishing destination to an alternate finishing destination in response to the default finishing station being no longer usable. The default and alternate finishing destinations are different types of finishing destinations. The marking engine in the image-forming system cycles down when the chaining operation is not enabled.

In an additional method for automatic finish output chaining in an image-forming system, the image-forming system has at least two finishing destinations. The image-forming system detects whether a default finishing destination of a current imaging job has an unlock trigger or a full condition. The image-forming system switches the current imaging job from the default finishing destination to the alternate finishing destination in response to the unlock trigger or the full condition. The default and alternate finishing destinations are different types of finishing destinations.

Other systems, methods, features, and advantages of the invention will be or will become apparent to one skilled in the art upon examination of the following figures and detailed description. All such additional systems, methods, features, and advantages are intended to be included within this description, within the scope of the invention, and protected by the accompanying claims.

BRIEF DESCRIPTION OF THE FIGURES

The invention may be better understood with reference to the following figures and detailed description. The components in the figures are not necessarily to scale, emphasis being placed upon illustrating the principles of the invention.

DETAILED DESCRIPTION OF THE PREFERRED EMBODIMENTS

Figure 1:
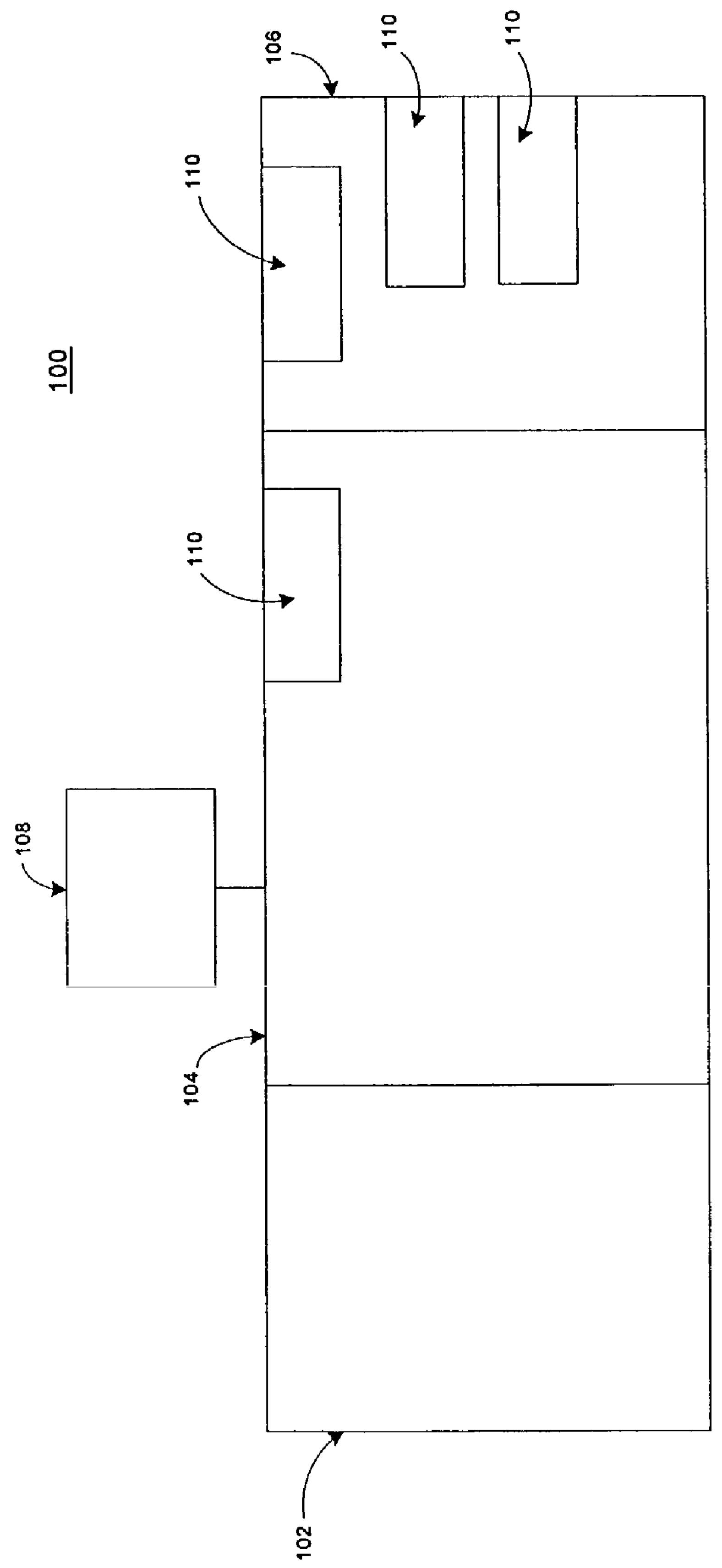
FIG. 1 represents a block diagram of an image-forming machine having automatic finish output chaining according to one embodiment.

FIG. 1 represents a block diagram of an image-forming machine 100 having automatic finish output chaining according to one embodiment. As discussed below, the automatic finish output chaining enables the image-forming machine 100 to automatically switch to an alternate finishing destination when a default finishing destination is no longer usable for an imaging job. The default destination may become no longer usable if the destination is full, unlocked by a user, or for another reason. While particular configurations are shown, other configurations and arrangements may be used including those with other and additional components.

The image-forming machine 100 may be an electrophotographic device such as one of the Digimaster® digital printers manufactured by Heidelberg Digital L.L.C. located in Rochester, N.Y. The image-forming machine 100 also may be another electrophotographic machine, a photocopy machine, a printing device, or the like. The image-forming machine 100 has a feeder 102, a marking engine 104, a finisher 106, a user interface 108, and at least two finishing destinations 110. The image-forming machine 100 may have other equipment such as a graphic user interface (not shown) and a logic control unit (not shown). The feeder 102, the marking engine 104, the finisher 106, and the user interface 108 may be separate or integrated components. The user interface 108 may be a display unit with push buttons (not shown) or other activation means for inputting control parameters to the image-forming machine 100. The other activation means includes a touch screen with a mouse and a keyboard.

The finishing destinations 110 may form part of the finisher 106 and the marking engine 104. The finishing stations may be different types of finishing stations, where the finishing operation for one type is not the same as the finishing operation for another type. The finishing destinations 110 may include a stapler tote area, a top exit, and a stacker. There may be other types of finishing destinations and multiples of each type of finishing destination. There also may be more or less finishing destinations. The finishing destinations may be in other or different locations on the image-forming machine 100. One destination may be selected as a "trash" exit, where sample sheets, page sheets, jam clearance sheets, and the like are delivered. In one aspect, the trash exit is a top exit on the finisher 106.

Each finishing destination 110 has a finishing sensor or a similar device (not shown) to detect whether the destination has reached a full condition. The full condition may be when the destination cannot accept any additional sheets. The full condition may be when the destination can accept a predetermined number of additional sheets. The predetermined number may be fixed or may be adjusted by a user to address variations in the sheet weight, sheet size, sheet type, or other factors in the image-forming process. In one aspect, the predetermined number is user-configured in the range of about zero sheets through about 100 sheets. A counter may be used to determine the number of sheets that have passed beyond the full condition. Another counter may be used to determine the number of sheets until the next set, subset, or job boundary in the imaging job. The counters may be used to determine whether and when the image-forming machine can switch the destination of the imaging job such as when the image-forming process reaches a set, subset, or a job boundary.

One or more of the finishing destinations 110 has a lock or latch (not shown) that is released for access to the finishing destination. In one aspect, a stapler finishing destination has one lock (not shown) and a stacker finishing destination has another lock (not shown). Each lock may be released electrically, mechanically, or otherwise at the finishing destination, the user interface, or elsewhere on the image-forming machine. The image-forming machine may have a switch, code entry, or other device (not shown) for release of a lock electrically. The image-forming machine may have a lock, sensor, or similar device (not shown) for detecting when a lock is released mechanically. Other lock release mechanisms may be used. When a lock is released at a finishing destination, the image-forming machine detects an unlock condition or an unlock trigger.

In operation the feeder 102 provides marking or copying sheets to the marking engine 104. The sheets may be one or a combination of paper, transparencies, and other medium. The sheets may be configured with pre-punched holes, tabs, and the like. The marking engine 104 includes a photoconductor (not shown), one or more chargers (not shown), an exposure machine (not shown), a toning station (not shown), and a fuser station (shown). The photoconductor is selectively charged and optically exposed to form an electrostatic latent image on the surface. Toner is deposited onto the photoconductor surface. The toner is charged, thus adhering to the photoconductor surface in areas corresponding to the electrostatic latent image. The toner image is transferred onto a sheet. In the fuser station, the sheet is heated causing the toner to fix or adhere to the paper or other medium. The sheet exits the marking engine 104 and enters the finisher 106, which may discharge the sheet as is to the finishing destination 110. The finisher 106 may perform one or more finishing operations such as stapling, folding, and inserting an inserted sheet and then discharge the sheet or a bound set of sheets to the finishing destination 110.

An imaging job comprises the image transfer and finishing of one or more sets. Each set comprises one or more sheets, which may be organized into subsets. The start and end of the imaging job creates the boundaries for the imaging job. Each imaging job has a default destination depending upon the finishing of the imaging job. The default destination may be the stapler for an imaging job having stapled sets. The default destination may be the stacker for an imaging job having collated, unstapled sets. The default destination may be the trash exit for an imaging job having print sample sheets. There may be other default destinations.

In one aspect, an imaging job comprises five sets of a stapled booklet. Each set comprises 90 sheets organized into three subsets having 20, 30, and 40 sheets respectively. In this aspect, the beginning of the first set and the end of the fifth or last set form the job boundaries of the imaging job. The default destination is the stapler. The imaging job may have different job boundaries, a different default destination, a different number of sets, and a different number of subsets.

The user interface 108 has a configurable device level setting for enabling or disabling a "Finishing Output Chaining" operation in the image-forming machine 100. The default for the "Finishing Output Chaining" operation may be selected to disable the operation. A user can enable or disable the output chaining feature with an unlock request and an output accessory full condition. A user may enable the "Finish Output Chaining" operation for both unlock and full conditions or may sub-enable the operation for one of the unlock and full conditions.

Figure 2:
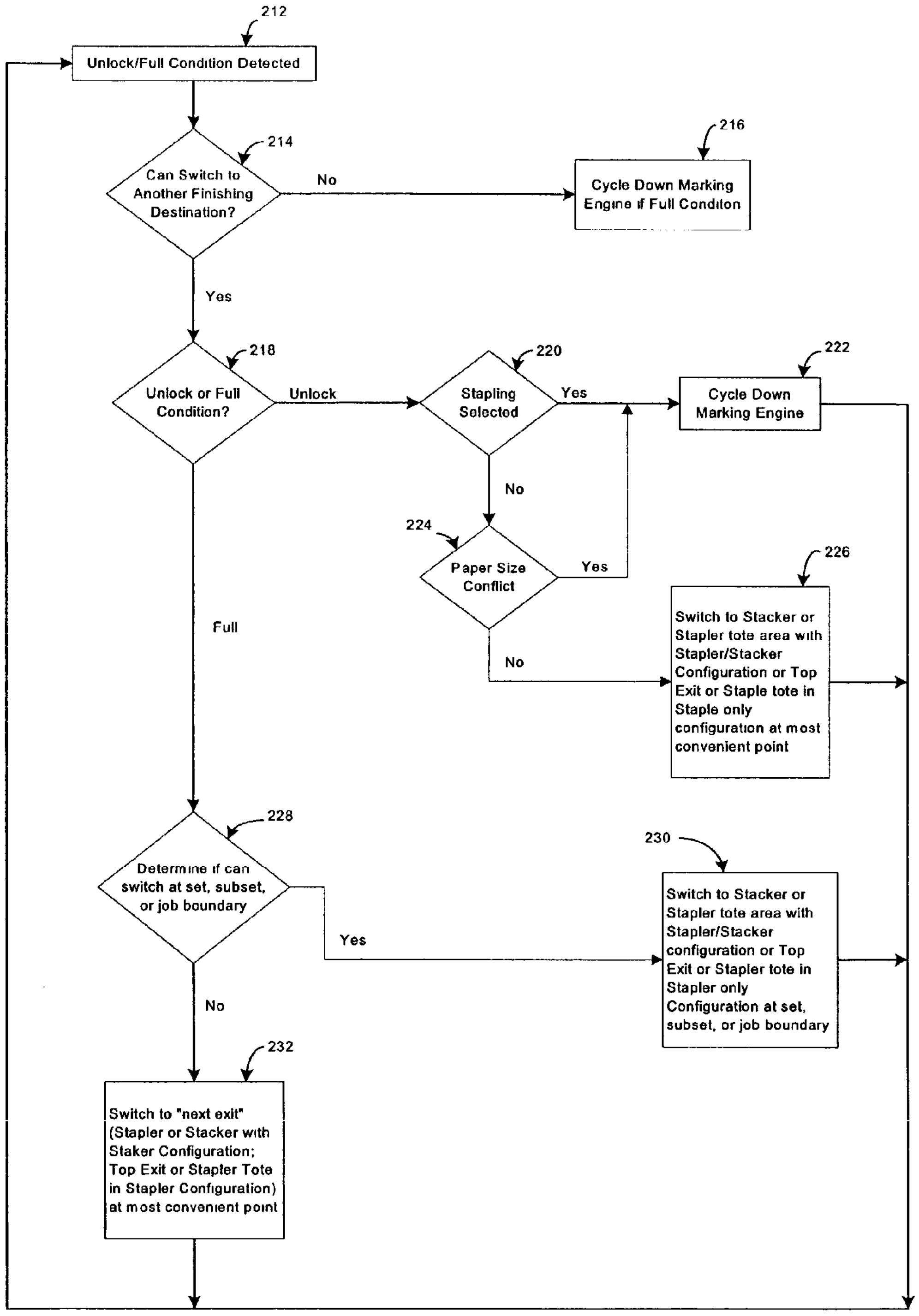
FIG. 2 represents a flow chart of a method for automatic finish output chaining in an image-forming machine according to one embodiment.

FIG. 2 represents a flow chart of a method for automatic finish output chaining in an image-forming machine according to one embodiment. The image-forming machine detects 212 an unlock and or a full condition. As previously discussed, a user may enable or disable a "Finishing Output Chaining" operation through a user interface. The image-forming machine determines 214 whether a switch can be made to another finishing destination. In one aspect, the other finishing destination is a different type of finishing destination. In another aspect, the other finishing destination is essentially the same type of finishing destination. If the switch cannot be made, the image-forming machine cycles down 216 the marking engine. If the switch can be made, the image-forming machine determines 218 whether there is an unlock condition or a full condition.

If there is an unlock condition, the image-forming machine determines 220 whether stapling is selected. If stapling is selected, the image-forming machine cycles down 222. If stapling is not selected, the image-forming machine determines 224 whether there is a paper size conflict with the other finishing destination. If there is a paper size conflict, the image-forming machine cycles down 222. If there is not a paper size conflict, the image-forming machine switches 226 to another finishing destination such as a top exit, stacker, or stapler tote area. In a stapler only configuration, the switch may be done at the most or a more convenient point in the print job.

If there is a full condition 218, the image-forming machine determines 228 if a switch may be made at a set boundary, subset boundary, or a job boundary in the print job. If a switch can be made the set boundary, subset boundary, or a job boundary in the print job, the image-forming machine switches 230 to another finishing destination such as a top exit, stacker, or stapler tote area at that boundary. In a stapler only configuration, the switch may be done at the set, subset, or job boundary. If a switch cannot be made at the set, subset, or job boundary in the print job, the image-forming machine switches 232 to a "next exit" finishing destination at the most or more convenient point in the print job. The "next exit" is the stapler or stacker in a stacker configuration. The "next exit" is the top exit or stapler tote area in the stapler configuration.

In one aspect, the image-forming machine 100 has a stapler only accessory configuration. When an operator activates an unlock button 212 on the Stapler, all sheets having a page header processed by a marking engine job manager continue to the stapler tote area. These sheets include sheets already being printed within the marking engine paper path and queued sheets being fed into the paper path. Any new sheets processed into this queue will have a "top exit" finishing destination. Once the last sheet is received in the stapler tote area, the door interlock is released allowing the operator access to sheets within the stapler tote area. At this point, all sheets continue 226 to the top exit destination with all sheets marked as delivered. Upon closure of the stapler door, all sheets continue to the top exit until a full condition occurs 212. At that point, the marking engine determines 214 if a switch may be made to another finishing destination.

When there is a stapler full condition 218, the marking engine continues to print the job and determines whether the finishing operation can be switched at the set, subset, or job boundary 228. If the marking engine software determines there is sufficient space in the stapler tote to complete the currently printing set to that finishing destination 230, the marking engine continues delivery the remaining sheets of the set to the stapler tote area or tray. After the last sheet is received within the stapler tote area, the door interlock is released allowing the operator access to the sheets within the stapler tote area. The first page of the next set is marked for delivery to the "top exit" finishing destination. At this point, all sheets in the marking engine paper path continue to the top exit destination with all sheets being marked as delivered. The job continues to be finished at the top exit location until the top exit reaches a full condition. The marking engine then attempts to switch back to the stapler tote area or tray at the set boundary. If all the finishing destinations are full, the marking engine cycles down or shuts down with a full condition. If the marking engine determines the set size is too large to complete to the current finishing destination 232, the marking engine will switch at the most convenient point in the printing process. In this case the integrity of the currently printing sets may not be maintained.

In another aspect, the image-forming machine 100 has a stapler and stacker accessory configuration. When the operator pushes the unlock button on the stapler 212, all sheets whose page header was processed continue to the stapler tote area. These sheets include sheets already being printed within the marking engine paper path and queued sheets fed into the paper path. Any new sheets processed into this queue will be marked with the "stacker" finishing destination. After the last sheet is received within the stapler tote area, the door interlock is released allowing the operator access to the sheets within the stapler tote area. At this point, all sheets in the marking engine paper path continue 226 to the stacker finishing destination with all sheets being marked as delivered. After the stapler door is closed, all sheets continue to the stacker until a full condition occurs in the stacker or the unlock button is pressed 212. At this point, the marking engine determines if a switch to another finishing destination may be made 214. If all finishing destinations are full, the marking engine cycles down 216 with a full condition.

After the operator pushes the unlock button on the Stacker 212, all sheets whose page header was processed continue to the stacker tote area. These sheets include sheets already being printed within the marking engine paper path and queued sheets that will be fed into the paper path. Any new sheets processed into this queue will be marked with the "Stapler Tote" finishing destination. Upon receipt of the last sheet within the Stacker tote area, the door interlock is released allowing the operator access to the sheets within the tote area. At this point, all sheets in the marking engine paper path continue 226 to the stapler tote destination with all sheets being marked as delivered. Upon closure of the stacker door, all sheets continue to the stapler tote area until a full condition occurs or the unlock button is pressed 212. At this point the marking engine determines a switch can be made to another finishing destination. If all finishing destinations are full, the marking engine cycles down 216 with a full condition.

Upon a stapler full condition 218, the marking engine continues to print the job and determines 228 whether the finishing operation can be switched at the set, subset, or job boundary. If the marking engine determines there is sufficient space in the finishing destination to complete the currently printing set to the stapler tote, the marking engine will continue 230 delivering the remaining sheets to that destination. Upon receipt of the last sheet within the stapler tote area, the door interlock will be released allowing the operator access to the sheets within the tote area. The first page of the next set is marked for delivery to the "Stacker" finishing destination with all sheets being marked as delivered. The job continues to be finished to the Stacker location until the Stacker goes to a full or unlock condition. At this point the marking engine attempts to switch back 214 to the stapler tote tray at the set boundary. If all the finishing destinations are full, the marking engine cycles down 216 with a full condition. If the marking engine determines 232 the set size is too large to complete to the current finishing destination, the marking engine switches at the most convenient point in the printing process. In this case, the integrity of the currently printing sets may not be maintained.

Upon a stacker full condition 218, the marking engine continues to print the job and determines 228 whether the finishing operation can be switched at the set, subset, or job boundary. If the marking engine determines there is sufficient space in the finishing destination to complete the currently printing set to the stacker tote, the marking engine will continue 230 delivering the remaining sheets to that destination. Upon receipt of the last sheet within the stacker tote area, the door interlock is released allowing the operator access to the sheets within the Stacker tote area. The first page of the next set is then marked for delivery to the "Stapler" finishing destination. At this point, all sheets in the marking engine paper path continue to the stapler destination with all sheets being marked as delivered. The job continues to the stapler location until the stapler goes to a full or unlock condition 212. At this point, the marking engine attempts to switch back 214 to the stacker tote tray at the set boundary. If all the finishing destinations are full, the marking engine cycles down 216 with a full condition. If the marking engine determines 228 the set size is too large to complete to the current finishing destination, the marking engine switches 232 at the most convenient point in the printing process. In this case, the integrity of the currently printing sets may not be maintained.

The output chaining operation may occur at and will function across job boundaries. The software always checks to determine if the original specification for the job can be met. For example, a job with the destination of stapler but not requesting any staples (using the stapler tote area for stacking of non-stapled sets) will chain and complete the job if possible to the Stacker upon a full condition. Normally, the next job is processed to the stacker as the last finishing destination used. Should the next job's specification contain a stapling request, the software automatically switches and prints the job to the stapler if it is not currently in the full condition.

If the customer submits a job to the printer containing stapling, the marking engine processes the job. If a full condition occurs or a unlock request is received, the marking engine cycles down and stops if the marking engine is in an output chaining mode since the stacker or top exit cannot perform a stapling operation. This is to insure that the finishing integrity of the job is maintained.

If the customer submits a job to the stacker with a paper size that is not supported 234 by the stapler, the marking engine cycles down 222 and stops if a full condition occurs or an unlock request is received. This behavior is also true if a job is submitted to the Stapler and has a paper size that is not supported by the Stacker.

Figure 3:
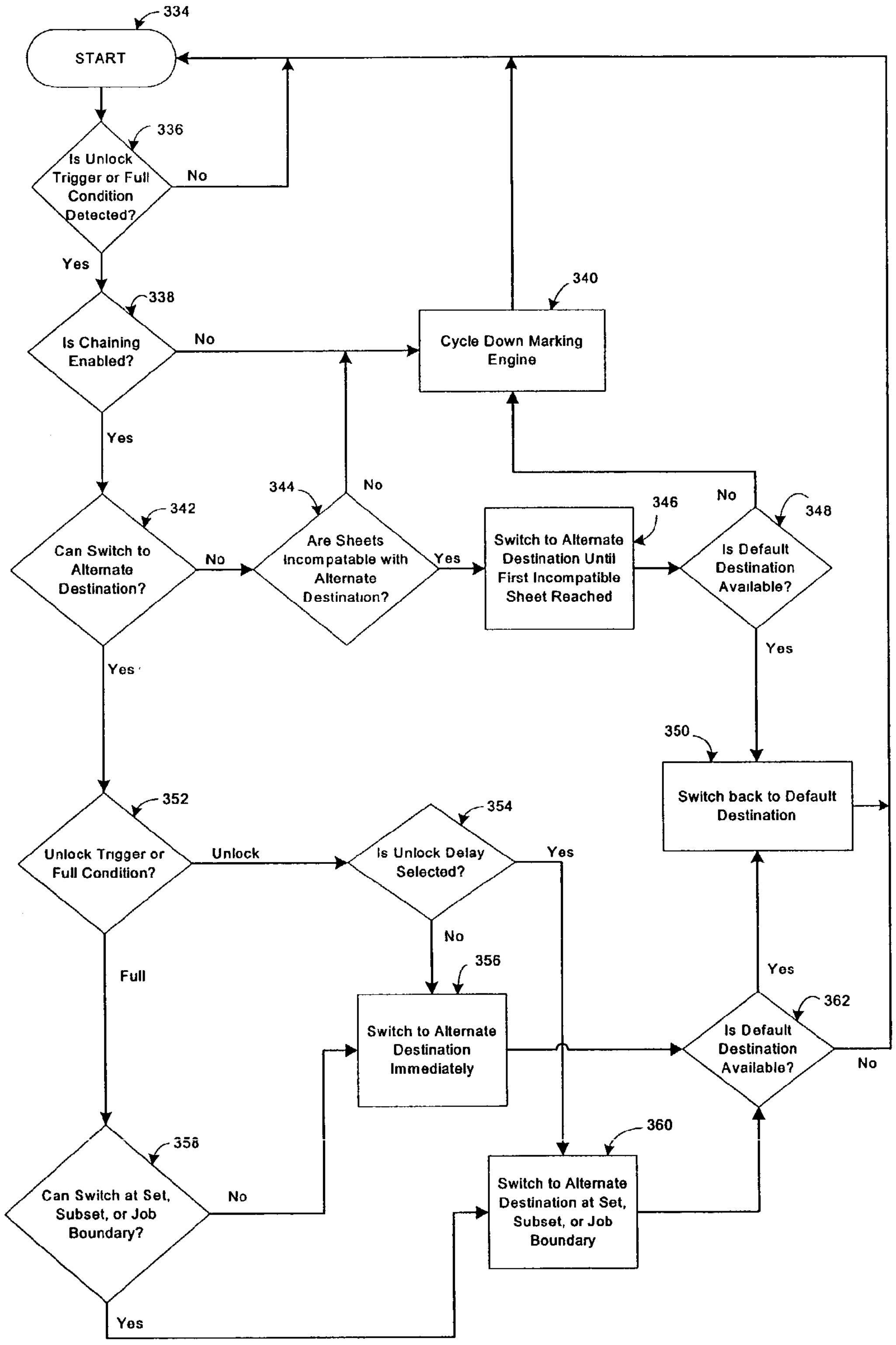
FIG. 3 represents a flow chart of a method for automatic finish output chaining in an image-forming machine according to another embodiment.

FIG. 3 represents a flowchart of a method for an automatic finish output chaining in an image-forming system according to another embodiment. At start 334, the image-forming system is processing or has started processing an imaging job. The image-forming machine determines 336 whether the default destination for the imaging job is no longer usable such as when an unlock trigger or a full condition is detected. If no unlock trigger or full condition is detected 336, the image-forming machine continues 334 processing the imaging job. If an unlock trigger or a full condition is detected 336, the image-forming system determines 338 whether the chaining operation has been enabled. If the chaining operation is not enabled, the image-forming system cycles down 340 until the marking engine is restarted 334.

When the marking engine cycles down 340, the marking engine enters an operational mode where the imaging process essentially stops. In one aspect, the operation mode is to shut-off all components in the marking engine. In this aspect, the components would have to restart and progress through warm-up procedures prior to starting the imaging process again. This restart from shut-off may result in longer production delays and may cause all or part of the imaging job and instructions to be lost from memory in the image-forming system. In another aspect, the operational mode is to place all components on standby where the components remain in an on state but not performing the imaging process. When on standby, the feeder stops feeding sheets and any in-process sheets cycle through the marking engine and finisher to the default destination or the trash exit. In this aspect, the image-forming system remains essentially ready to begin the imaging process once the reason for the cycle down is addressed. There may be other standby and operational modes for cycling down the marking engine.

If chaining is enabled 338, the image-forming system determines 342 whether the imaging job can be switched from the default destination to an alternate destination. In one aspect, the alternate destination is a different type of finishing destination than the default destination. In another aspect, the alternate destination is essentially the same type of finishing destination as the default destination. The default destination depends upon the specifications of the imaging job. The image-forming system compares the specifications for the imaging job with available finishing destinations. The alternate destination may be any finishing destination other than the default destination that is capable of handling part or all of the specifications for the imaging job. The specifications of the imaging job include such factors as the sheet size, stapling, and the like.

If the imaging job cannot switch to the alternate destination 342, the image-forming system determines 344 whether the switch cannot be made because one or sheets may be incompatible due to size, weight, or other factors. If the sheets are not incompatible 344 with the alternate destination, the switch cannot be made for other reasons and the marking engine cycles down 340. If one or more sheets are incompatible with the alternate destination 344, the imaging job switches to the alternate destination until the first incompatible sheet is reached 346. When an incompatible sheet is reached, the image-forming machine determines 348 whether the default destination is available. If the default destination is available 348, the imaging job switches 350 back to the default destination. If the default destination is not available 348, the marking engine cycles down 340.

If the imaging job can switch to an alternate destination 342, the image-forming system determines 352 whether there is an unlock or full condition at the default destination. If there is an unlock condition, the image-forming system determines 354 whether an unlock delay was selected. The unlock delay switches the imaging job at a less disruptive break point in the imaging job such as a set boundary, a subset boundary, or a job boundary. When the unlock delay is selected 352, a user must wait for the default destination to unlock when the imaging job reaches the break point. A break point may be the set boundary, the subset boundary, the job boundary, or another place in the imaging job for switching the imaging job to another destination. If the unlock delay is selected 354, the imaging job switches 360 to the alternate destination at the break point. If the unlock delay is not selected 354, the imaging job switches 356 to the alternate destination essentially immediately where few or no additional sheets pass to the default destination.

If there is a full condition 352, the image-forming system determines whether the imaging job can switch to the alternate destination at a break point such as the set, subset, or job boundary. The image-forming system compares the number of sheets left for the imaging job to reach the breakpoint with the predetermined number of additional sheets beyond the full condition. As discussed, one or more counters may be used to determine the number of sheets to reach the breakpoint and the number of sheets beyond the full condition. If the number of sheets to reach the breakpoint is less than the predetermined number, the imaging job can switch at the breakpoint. If the number of sheets to reach the breakpoint is more than the predetermined number, the imaging job cannot switch at the breakpoint. If the imaging job can switch at a breakpoint 358, the imaging job switches 360 to the alternate destination at the break point. If the imaging job cannot switch at a break point 358, the imaging job switches 356 to the alternate destination essentially immediately where few or no additional sheets pass to the default destination.

After the imaging job switches 356 and 360 to the alternate destination, the image-forming system determines 362 whether the default destination is available. If the default destination is available, the imaging job switches back 350 to the default destination and continues 334. If the default destination is not available, the image job continues 334 with the alternate destination, which essentially becomes a new default destination.

Figure 4:
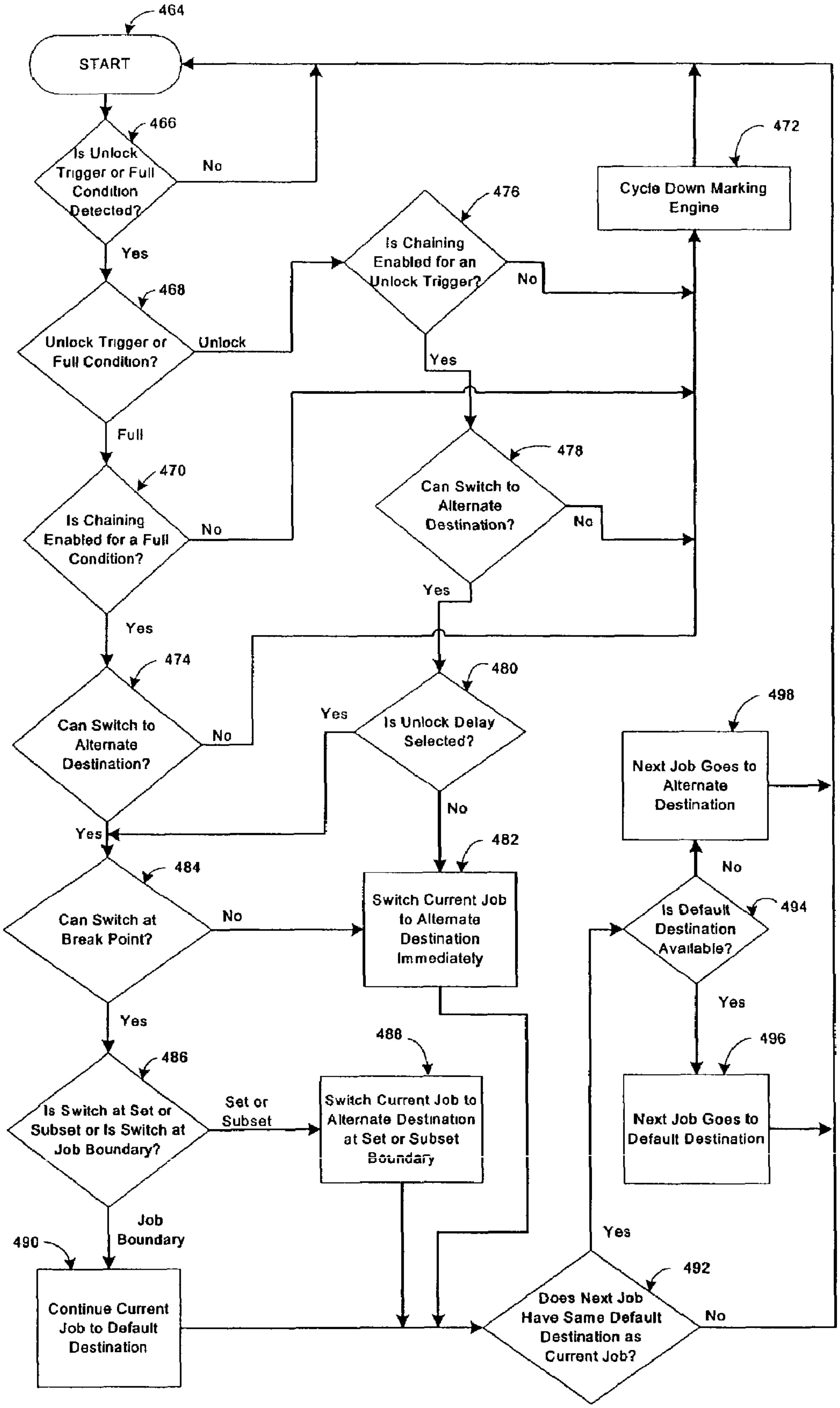
FIG. 4 represents a flow chart of a method for automatic finish output chaining in an image-forming machine according to a further embodiment.

FIG. 4 represents a flowchart of a method for an automatic finish output chaining in an image-forming system according to a further embodiment. At start 464, the image-forming system is processing or starting an imaging job. The image-forming machine determines 466 whether the default destination for the imaging job is no longer usable such as when an unlock trigger or a full condition is detected. If an unlock trigger or a full condition is not detected 466, the image-forming machine continues 464 processing the imaging job. If an unlock trigger or a full condition is detected 466, the image-forming system determines 468 whether there is an unlock trigger or a full condition. If there is a full condition 468, the image-forming machine determines 470 whether the chaining operation is enabled for a full condition. If the chaining operation is not enabled for a full condition 470, the image-forming system cycles down 472 the marking engine until restarted 464. If the chaining operation is enabled for a full condition 470, the image-forming system determines 474 whether the imaging job can switch from the default destination to an alternate destination. If the imaging job cannot switch to an alternate destination 474 in response to the full condition, the marking engine cycles down 472 until restarted 464.

When the marking engine cycles down 472, the marking engine enters an operational mode where the imaging process essentially stops. In one aspect, the operation mode is to shut-off all components in the marking engine. In this aspect, the components would have to restart and progress through warm-up procedures prior to starting the imaging process again. This restart from shut-off may result in longer lost from memory in the image-forming machine. In another aspect, the operational mode is to place all components on standby where the components remain in an on state but not performing the imaging process. When on standby, the feeder stops feeding sheets and any in-process sheets cycle through the marking engine and finisher to the default destination or the trash exit. In this aspect, the image-forming system remains essentially ready to begin the imaging process once the reason for the cycle down is addressed. There may be other standby and operational modes cycling down the marking engine.

As discussed, the default destination depends upon the imaging job. The alternate destination may be any finishing destination other than the default destination that is capable of handling the part or all of the specifications for the imaging job. In one aspect, the alternate destination is a different type of finishing destination than the default destination. In another aspect, the alternate destination is essentially the same type of finishing destination as the default destination. Whether the imaging job can switch to the alternate destination depends upon the specifications of the imaging job such as the sheet size, stapling, and other factors.

If there is an unlock trigger 468, the image-forming system determines 476 whether the chaining operation is enabled for an unlock trigger. If the chaining operation is not enabled for an unlock trigger 476, the marking engine cycles down 472 until restarted 464. If the chaining operation is enabled for an unlock trigger 476, the image-forming system determines 478 whether the imaging job can switch from the default destination to an alternate destination. If the imaging job cannot switch to an alternate destination 478, the marking engine cycles down 472 until restarted 464.

If the imaging job can switch to an alternate destination 478 in response to the unlock trigger, the image-forming system determines 480 whether an unlock delay was selected. The unlock delay switches the imaging job at a less disruptive break point in the imaging job such as at a set boundary, subset boundary, or job boundary. When an unlock delay is selected, a user must wait for the default destination to unlock when the imaging job reaches the break point. A break point may be the set boundary, the subset boundary, the job boundary, or another place in the imaging job for switching the imaging job to another destination. If an unlock delay is not selected, the current imaging job switches 482 to the alternate destination essentially immediately where few or no additional sheets pass to the default destination.

If the imaging job can switch to an alternate destination in response to a full condition 474 or an unlock delay was selected 480, the image-forming system determines 484 whether the imaging job can switch to the alternate destination at a break point such as the set boundary, subset boundary, or job boundary. The image-forming system compares the number of sheets remaining for the imaging job to reach the breakpoint with a predetermined number of additional sheets beyond a full condition. In one aspect, the predetermined number is about 100 sheets. As discussed, one or more counters may be used to determine the number of sheets to reach the break point and the number of sheets beyond a full condition. If the number of sheets to reach the breakpoint is less than the predetermined number, the imaging job can switch at the breakpoint. If the number of sheets to reach the breakpoint is more than the predetermined number, the imaging job cannot switch at the breakpoint.

If the imaging job cannot switch at a break point 484, the current imaging job switches 482 to the alternate destination essentially immediately where few or no additional sheets pass to the default destination.

If the imaging job can switch at a break point 484, the image-forming system determines 486 whether the switch is at the set or subset boundary or whether the switch is at the job boundary. If the switch is at the set or subset boundary 486, the current imaging job is switched 488 to the alternate destination at the set or subset boundary. If the switch is at a job boundary 486, the current imaging job continues 490 to the default destination.

When the current imaging job switches 482 and 488 to the alternate destination or the current imaging job continues 490 to the default destination, the image-forming system determines 492 whether the next imaging job has the same default destination as the current imaging job. If the current and next imaging jobs do not have the same default destination 492, the image-forming system continues 464 with the next imaging job. If the current and next jobs have the same default destinations 492, the image-forming system determines 494 whether the default destination is available. If the default destination is available 494 the next imaging job goes 496 to the default destination and continues processing 464. If the default destination is not available 494, the next imaging job goes 498 to the alternate destination and continues processing 464.

Various embodiments of the invention have been described and illustrated. However, the description and illustrations are by way of example only. Other embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except in light as necessitated by the accompanying claims and their equivalents.

What is claimed is:

1. An image-forming system comprising:

a marking engine; and a finisher connected to the marking engine;

wherein at least one of the marking engine and the finisher comprises a first finishing destination and a second finishing destination, the first finishing destination receives an imaging job from the marking engine, the imaging job switches from the first finishing destination to the second finishing destination when the first finishing destination becomes unavailable and then switches back to the first finishing destination when the first finishing destination is later available, the first and the second finishing destinations are different types of finishing destinations, the first finishing destination is capable of handling all of the imaging job, and the second finishing destination is incapable of handling part of the imaging job; and wherein the imaging job switches back to the first finishing destination when the part of the imaging job that the second finishing destination is incapable of handling is received and the first finishing destination is available.

2. The image-forming system according to claim 1, wherein the imaging job has one or more break points and the imaging job switches to the second finishing destination at one of the break points.

3. The image-forming system according to claim 2, wherein the break point is one of a set boundary, a subset boundary, and a job boundary.

4. A method for automatic finish output chaining in an image-forming system during printing of an imaging job having a plurality of sheets, comprising:

beginning delivery of the imaging job to a default finishing destination compatible with all of said sheets;

detecting whether the default finishing destination is no longer usable;

determining whether an alternate finishing destination compatible with some of said sheets and incompatible with others of said sheets is available;

switching the imaging job from the default finishing destination to the alternate finishing destination in response to the default finishing destination being unusable and the alternate finishing destination being available;

continuing delivery of the imaging job until one of said incompatible sheets is reached;

determining whether the default finishing destination has again become available;

switching back to the default finishing destination when the first finishing destination has again become available;

continuing delivery of the imaging job; and cycling down a marking engine in the image-forming system when a respective finishing destination is determined to be unavailable.

5. The method for automatic finish output chaining according to claim 4, further comprising cycling down the marking engine to a standby operation.

6. The method for automatic finish output chaining according to claim 4, wherein the switching to the alternate finishing destination further comprises switching the imaging job to the alternate finishing destination at a break point if the switch can be made at the break point; and switching the imaging job to the alternate finishing destination essentially immediately if the switch cannot be made at the break point.

7. The method for automatic finish output chaining according to claim 6, where the break point is one of a set boundary, a subset boundary, and a job boundary.

8. The method for automatic finish output chaining according to claim 6, wherein said detecting further comprises determining that the default finishing destination has reached a full condition and said switching from said default finishing destination further comprises determining that the imaging job has a number of remaining sheets to reach the break point, wherein the default finishing destination can receive a predetermined number of sheets beyond the full condition and the remaining sheets to reach the break point are less than the predetermined number of sheets beyond the full condition.

9. The method for automatic finish output chaining according to claim 8, wherein the predetermined number of sheets is about 100 sheets.

10. The method for automatic finish output chaining according to claim 4, wherein said switching from said default finishing destination further comprises:

detecting an unlock delay; and switching the imaging job to the alternate finishing destination at a break point in response to the unlock delay.

11. The method for automatic finish output chaining according to claim 10, where the break point is one of a set boundary, a subset boundary, and a job boundary.

12. A method for automatic finish output chaining in an image-forming system having at least two finishing destinations, comprising:

detecting whether a default finishing destination of a current imaging job has an unlock trigger, the unlock trigger representing a physical unlocking of the default finishing destination to provide physical access thereto; and switching the current imaging job from the default finishing destination to an alternate finishing destination in response to the unlock trigger, the default and the alternate finishing destinations being different types of finishing destinations wherein the default finishing destination is compatible with all of the current imaging job and the alternate finishing destination is incompatible with part of the current imaging job:

before the incompatible part of the current printing job is reached, determining whether the unlock trigger is gone; and then switching back to the default destination.

13. The method for automatic finish output chaining according to claim 12, further comprising cycling down a marking engine in the image-forming system in response to the unlock trigger when a chaining operation is not enabled for the unlock trigger.

14. The method for automatic finish output chaining according to claim 12, wherein said switching to an alternate finishing destination further comprises switching the current imaging job to the alternate destination essentially immediately when the current imaging job cannot be switched at a break point.

15. The method for automatic finish output chaining according to claim 12, wherein said switching to an alternate finishing destination further comprises switching the current imaging job to the alternate finishing destination at a break point.

16. The method for automatic finish output chaining according to claim 15, where the break point comprises one of a set boundary, a subset boundary, and a job boundary.

17. The method for automatic finish output chaining according to claim 16, wherein said switching to an alternate finishing destination further comprises switching the current imaging job to the alternate finishing destination at one of the set boundary and the subset boundary.

18. The method for automatic finish output chaining according to claim 12, wherein said switching to an alternate finishing destination further comprises switching to the alternate destination essentially immesiately in response to the unlock trigger.

19. An image-forming machine comprising:

a marking engine printing an imaging job having a plurality of sheets;

a finisher disposed to receive the imaging job from the marking engine; and first and second finishing destinations, each finishing destination being disposed to receive the sheets from the finisher, the first finishing destination, when available, being compatible with all of said sheets, and the second finishing destination, when available, being incompatible with some of said sheets;

wherein the finisher uses the first finishing destination for one or more of said sheets, then automatically changes from the first finishing destination to the second finishing destination when the first finishing destination becomes unavailable and said second finishing destination is available, and then automatically changes back to the first finishing destination when one of the sheets incompatible with the second finishing destination is received by the finisher and the first finishing destination is again available.

20. The machine of claim 19 wherein each said finishing destination is unavailable when in one of an unlock condition and a full condition, the unlock condition representing a physical unlocking for physical access.

21. The machine of claim 19 wherein the finisher determines that the second finishing destination is incompatible with one or more others of said sheets before the finisher changes to the second finishing destination.

22. The image-forming machine according to claim 19, wherein the finishing destinations comprise at least one of: a stacker finishing destination, a stapler finishing destination, a stapler tote area, and a top exit.

23. The image-forming machine according to claim 19, wherein the marking engine cycles down when the change to the second finishing destination cannot be made.

24. The image-forming machine according to claim 19, wherein the marking engine cycles down when the change back to the first finishing destination cannot be made.

25. The image-forming machine according to claim 20, wherein the marking engine cycles down in response to the unlock condition of a respective said finishing destination.

26. The image-forming machine according to claim 19, wherein prior to each of the finisher changes the finisher determines whether to continue to one of a set, subset, and job boundary.

27. A method for automatic finish output chaining in an image-forming machine, comprising, in order:

printing an imaging job having a plurality of sheets;

beginning delivery of the imaging job to a first finishing destination compatible with all of said sheets;

determining that the first finishing destination has become unavailable;

determining that a second finishing destination is compatible with some of said sheets and incompatible with others of said sheets;

switching to the second finishing destination;

continuing delivery of the imaging job until one of said incompatible sheets is reached;

determining whether the first finishing destination has again become available;

switching back to the first finishing destination when the first finishing destination has again become available; and continuing delivery of the imaging job.

28. The method of claim 27 wherein the first finishing destination is unavailable when the first finishing destination is in one of an unlock condition and a full condition, the unlock condition representing a physical unlocking of the first finishing destination for physical access.

29. The method of claim 27 wherein said switching to the second finishing destination follows said determining that the second finishing destination is incompatible with others of said sheets.

30. The method for automatic finish output chaining according to claim 27, further comprising cycling down a marking engine in the image-forming machine if the switching to the second finishing destination cannot be made.

31. The method for automatic finish output chaining according to claim 27, wherein the second finishing destination is one of a stacker finishing destination and a stapler tote area.

32. The method for automatic finish output chaining according to claim 27, wherein the second finishing destination is one of a top exit and a stapler tote area.

* * * * *